Figure 1:
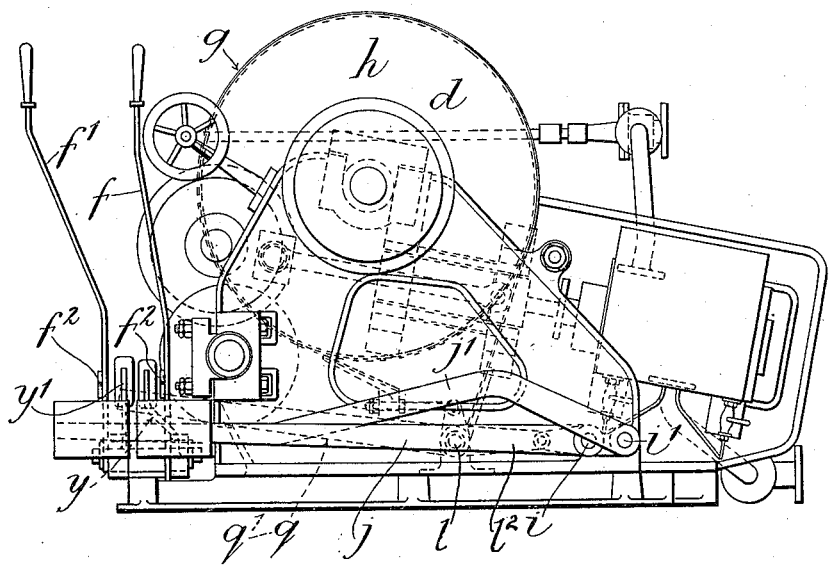

G. T. MACFARLANE & M. ROLEY.
SHIP AND LIKE WINCH ARRANGEMENT.
APPLICATION FILED OCT. 27, 1913.

1,139,131.

Patented May 11, 1915.
4 SHEETS—SHEET 1.

G. T. MACFARLANE & M. ROLEY.
SHIP AND LIKE WINCH ARRANGEMENT.
APPLICATION FILED OCT. 27, 1913.
1,139,131.
Patented May 11, 1915.
4 SHEETS—SHEET 2.
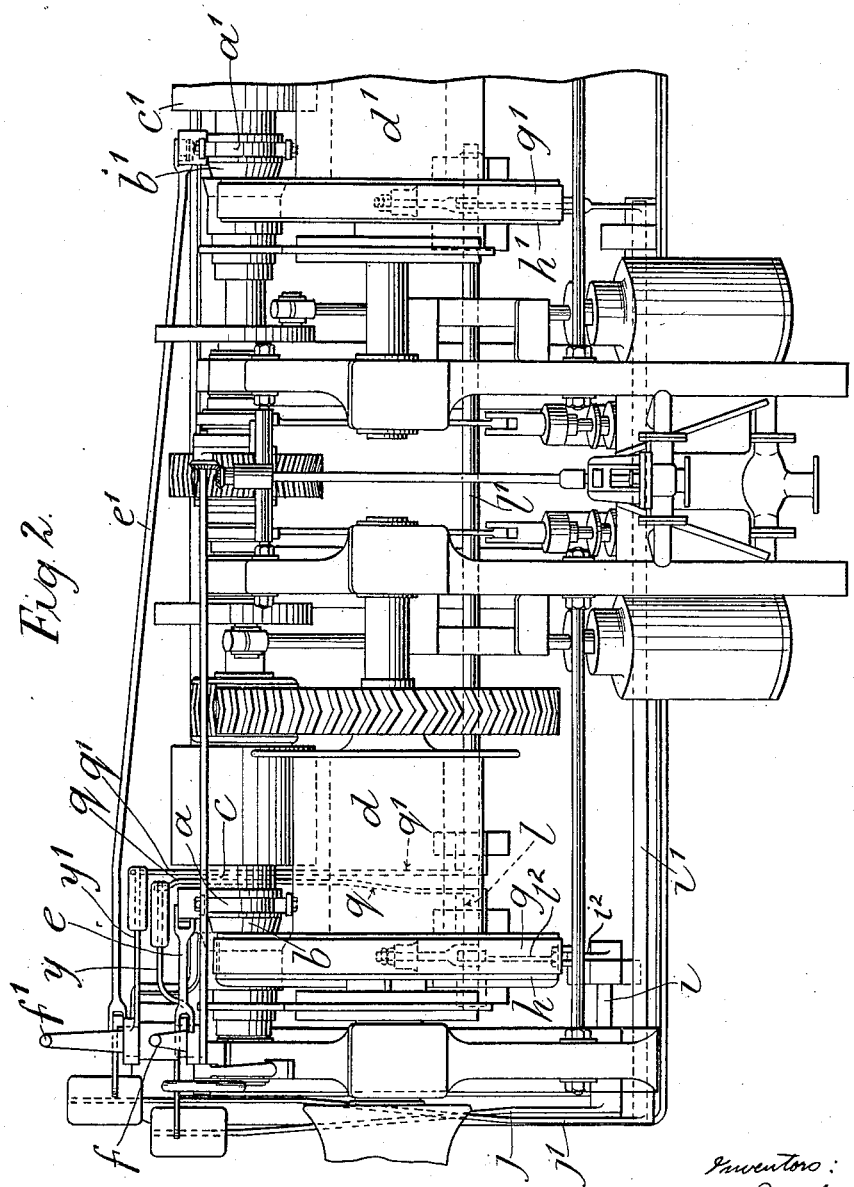

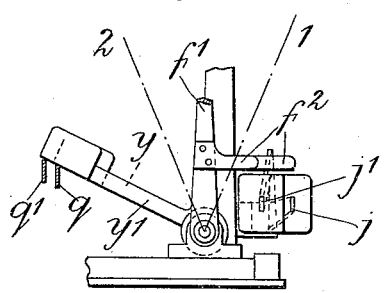
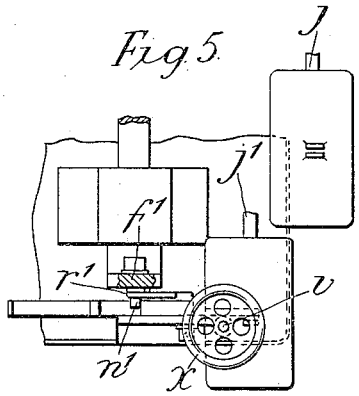
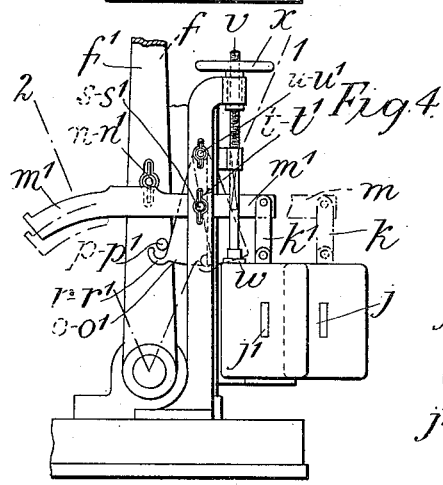
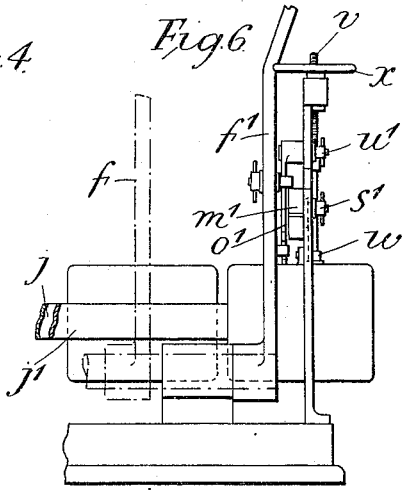

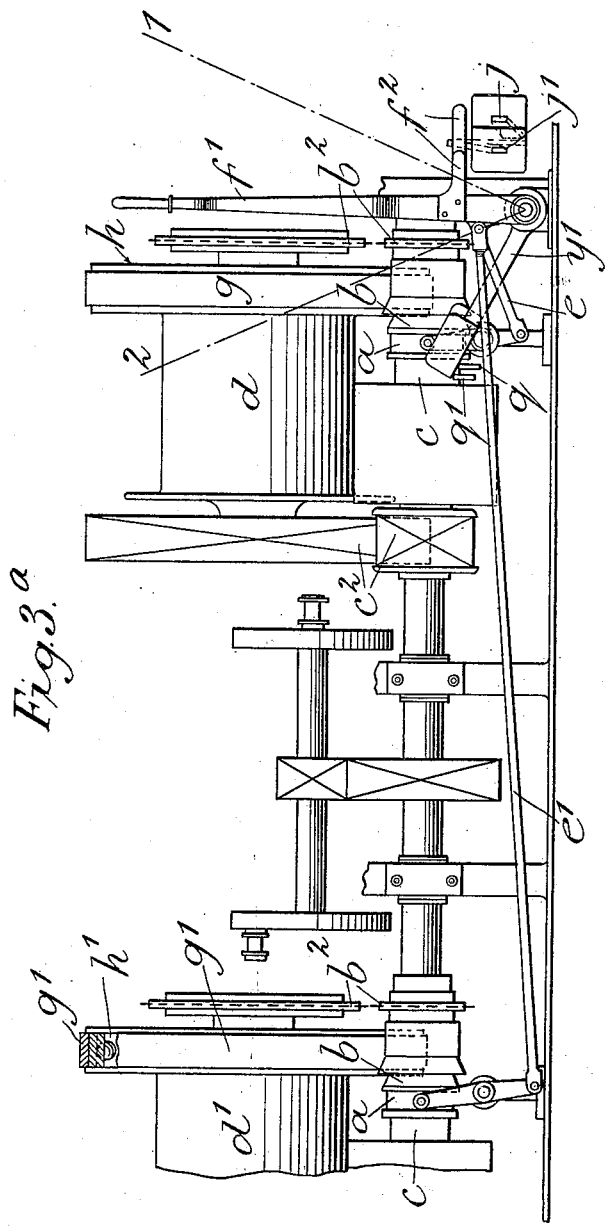

UNITED STATES PATENT OFFICE.

GEORGE THOMAS MACFARLANE, OF PINNER, AND MATTHEW ROLEY, OF SLOUGH, ENGLAND, ASSIGNORS TO G. D. PETERS AND COMPANY LIMITED, OF LONDON, ENGLAND, GEORGE THOMAS MACFARLANE, OF PINNER, ENGLAND, AND MATTHEW ROLEY, OF SLOUGH, BUCKS, ENGLAND.

SHIP AND LIKE WINCH ARRANGEMENT.

1,139,131.      Specification of Letters Patent.      Patented May 11, 1915.

Application filed October 27, 1913. Serial No. 797,700.

*To all whom it may concern:*

Be it known that we, GEORGE THOMAS MACFARLANE and MATTHEW ROLEY, subjects of the King of Great Britain and Ireland, residing, respectively, at Pinner, in the county of Middlesex, England, and Slough, in the county of Bucks, England, have invented Improvements in or Relating to Ship and like Winch Arrangements, of which the following is a specification.

This invention relates to that class of winch arrangement wherein a barrel is adapted to be driven in one direction by a motor with closure of one clutch and in the opposite direction with closure of another clutch, the said barrel having combined therewith a braking means adapted to operate automatically or in a self sustaining manner should an accident occur while hoisting and to be personally operated to enable the barrel to run under its own load or to be driven in overhauling direction, when desired. In the specification of British Letters Patent No. 7296 of 1912 granted to one of us, viz., G. T. Macfarlane, there is described an arrangement of this kind wherein the brake and suitable clutch mechanism are controlled by separate hand operated devices with which is associated interlocking gear devised to secure absolute reliability of operation.

Now the object of the present invention is to provide a winch arrangement of this kind which while preserving the same features of reliability is simpler in character and necessitates the employment of but one hand device. For this purpose it is arranged that the brake shall be capable of being applied under the action of a weight or equivalent load and released against the action of such load, by the lever controlling the clutches, the said lever, however having combined therewith means serving to interlock it with the loaded brake-applying mechanism, so that the hoisting clutch cannot be closed unless the brake is applied.

In describing the invention further it will be convenient to refer to the accompanying drawings which illustrate the improvements as applied to a multi-barrel winch, Figure 1 being an end elevation and Fig. 2 a plan of a portion of such winch. Figs. 3 and 3$^a$ are rear and part sectional elevations of part of Fig. 2 illustrating one arrangement according to the invention. Fig. 4 is a view similar to Fig. 3, Fig. 5 a corresponding plan and Fig. 6 a side elevation of another arrangement.

As shown in Figs. 1 to 3 the member $a$ common to the friction clutch element $b$ of the reversing gear $b^2$ and positive coil clutch $c$ of the hoisting gear $c^2$ associated with the barrel $d$ is connected by a rod $e$ to a hand lever $f$, the corresponding parts $a^1$, $b^1$ and $c^1$ of the barrel $d^1$ being similarly connected by a longer rod $e^1$ to a hand lever $f^1$. $g$, $g^1$ represent the brake straps of the free wheel clutch rings $h$, $h^1$ which when locked prevent backward rotation of the respective barrels $d$, $d^1$ without however effecting hoisting. $i$, $i^1$ are the rock shafts associated with the respective brake straps, the connection between the said shafts and the brake straps being made through bell cranks and levers. This will be understood from Fig. 1 where the shaft $i$ has a lever $i^2$ pivotally attached with loosener to one arm $l^2$ of a bell crank lever upon the shaft $l$. The shaft $l^1$ associated with the brake band of the other barrel is in alinement with the shaft $l$ as shown in Fig. 2.

$j$, $j^1$ are weighted levers serving normally to hold the brakes applied. The brakes thus applied may be released in various ways. In the example, since the weighted levers $j$, $j^1$ respectively act to turn shaft $l$, $l^1$ in one direction, the release may be effected by depressing levers $q$, $q^1$ to turn the shafts $l$ $l^1$ in the opposite direction. This depressing of the levers $q$, $q^1$ may be effected through arms $y$, $y^1$ projecting from the levers $f$ $f^1$ which arms may or may not be loaded to cause the levers $f$, $f^1$ to normally occupy the neutral position shown, where both clutches are open and the brakes remain applied by reason of the loaded levers $j$, $j^1$. Movement of the levers toward the position 2 results in a release of the brakes and, if the movement be continued far enough, a closure of the friction clutches $b$ to secure overhauling. Movement on the other hand to the position 1 results in closure of the clutches $c$ and hoisting. Since in the latter case it is essential that the clutches shall not be closed before the brakes are applied the levers $f$, $f^1$ are shown as provided each with a horn $f^2$ such that unless the corresponding lever $j$ or $j^1$ be in brake-applied position movement of the parts to effect hoisting is prevented. Such a horn acts also to prevent the brake being released while the hoisting clutch is closed.

A modified arrangement is shown in Figs. 4 to 6 where $k$, $k^1$ are links connecting the levers $j$, $j^1$ to arms $m$, $m^1$ so that by means of pins $n$, $n^1$ upon the hand levers $f$, $f^1$ such arms $m$, $m^1$ can, in predetermined positions of the hand levers, be rocked to lift the levers $j$, $j^1$ and release the brakes. The hand levers $f$, $f^1$ are shown in neutral position and as before require to be moved into the position 1 to hoist and to the position 2 to overhaul. The requisite locking of the brakes during the operation of hoisting is effected by providing in connection with each hand lever $f$, $f^1$ a device such as a pivoted detent $o$, $o^1$ that is adapted to be engaged by a pin $p$ or $p^1$ on the lever $f$ or $f^1$ when moving into the position 1 so that elevation of the corresponding lever $j$ or $j^1$ is prevented. Such device acts also as a detector of the brakes being applied, since, if either is not so applied the detent $o$ or $o^1$ is obstructed and prevents the lever $f$ or $f^1$ being moved home into position 1. In order to secure a positive return of the detent $o$ or $o^1$ to its normal position the pin $p$ or $p^1$ is caused to enter behind a horn $r$ or $r^1$ in moving to position 1 but becoming disengaged when the lever $f$ or $f^1$ is being moved from the neutral to position 2. The upper surface of the arms $m$, $m^1$ is such as to insure the brakes being maintained released with the levers $f$, $f^1$ in all positions between the neutral and overhauling positions without binding the brake gear that is to say without continuously increasing the movement of the brake mechanism.

For purposes of adjustment the pivots $s$, $s^1$ of the arms $m$, $m^1$ may be mounted to slide in guides $t$, $t^1$ as may also the pivots $u$, $u^1$ for the detents $o$, $o^1$, the pins $n$, $n^1$ on the levers $f$, $f^1$ being also conveniently adjustable.

If desired means may be provided for preventing the mechanism being operated, leaving the parts secure with the brake applied, such means being shown in the drawings as comprising a stem $v$ having a foot $w$ and adapted to be advanced into engagement with its lever $j$ or $j^1$ through a hand wheel $x$. Such means may be used to amplify the force exerted by the levers $j$, $j^1$ in applying the brakes, or this force may be otherwise augmented as by pressing the foot thereon.

What we claim is:—

1. A winch comprising a shaft, a barrel thereon, a weight applied free-wheel brake for such barrel, a unidirectional counter shaft, direct and reversing gear connecting the barrel and counter shafts, clutches adapted to render the different gears alternatively operative, a hand lever adapted to close one such clutch at a time, and means associated with the lever adapted to insure release of the brake before one clutch is closed and to arrest the lever and prevent the other clutch being closed unless the brake is applied.

2. A winch comprising a shaft, a barrel thereon, a weight applied free-wheel brake for such barrel, a unidirectional counter shaft, direct and reversing gear connecting the barrel and counter shafts, clutches adapted to render the different gears alternatively operative, a hand lever adapted to close one such clutch at a time and means associated with the lever adapted to insure release of the brake before one clutch is closed and to arrest the lever and prevent the other clutch being closed unless the brake is applied, such means also acting to prevent the brake being released after such other clutch has been closed.

3. A winch comprising a shaft, a barrel thereon, a weight-applied free-wheel brake for such barrel, a unidirectional counter shaft, direct and reversing gear connecting the barrel and counter shafts, clutches adapted to render the different gears alternatively operative, a hand lever adapted to close one such clutch at a time, a brake releasing arm adapted to be operated by the lever when closing the reverse driving clutch and a member movable with the lever when closing the direct driving clutch such member encountering the brake mechanism and arresting the lever before the clutch can be closed, if the brake be not applied.

Signed at London, England, this 16 day of October, 1913.

GEORGE THOMAS MACFARLANE.
MATTHEW ROLEY.

Witnesses:
H. D. JAMESON,
W. E. ROGERS.

Copies of this patent may be obtained for five cents each, by addressing the "Commissioner of Patents, Washington, D. C."